Oct. 2, 1951  H. W. OWENS  2,569,573
SPRING ENGAGED CLUTCH FOR TYPOGRAPHICAL MACHINES
Filed March 5, 1948  2 Sheets-Sheet 1
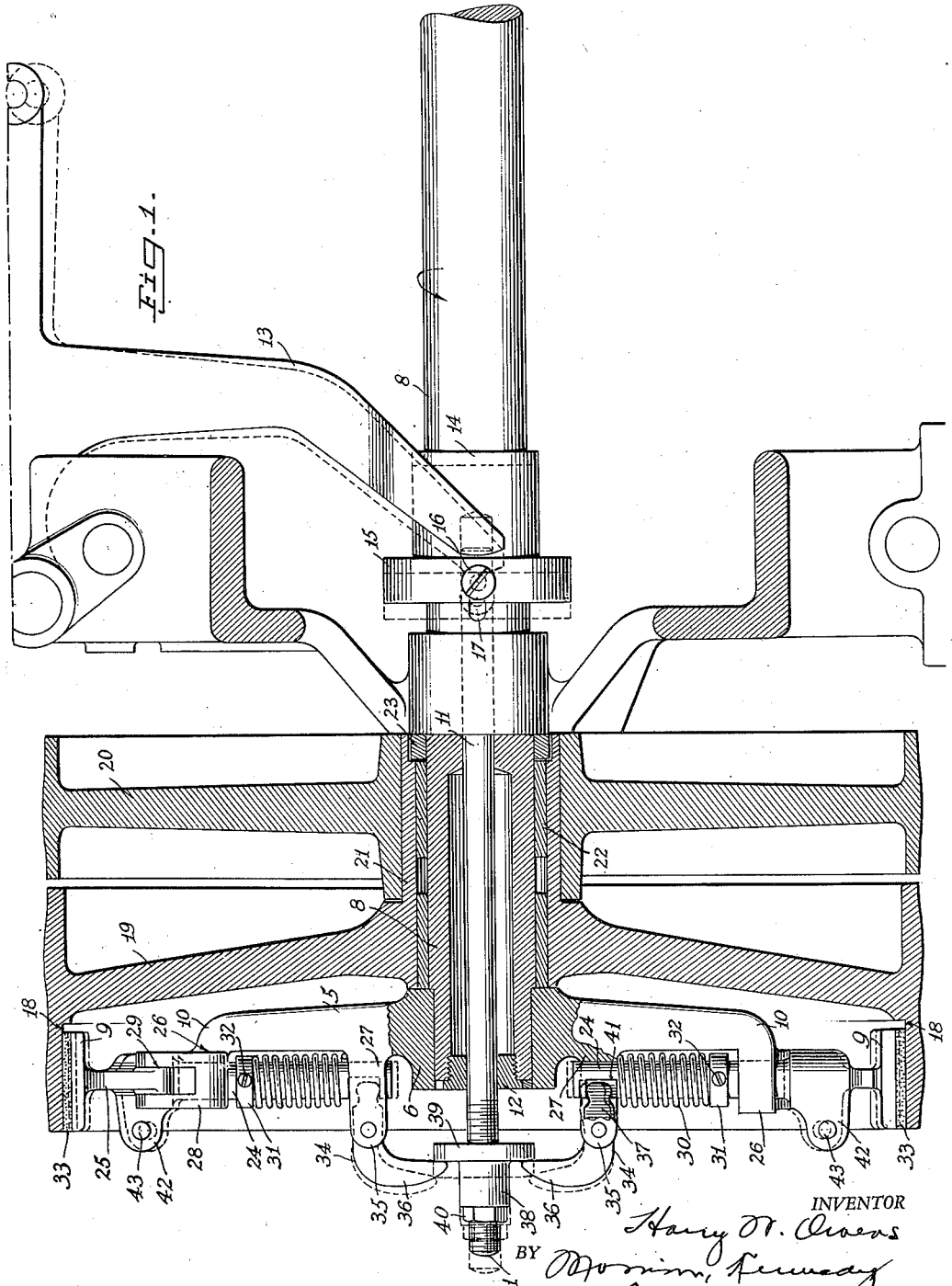
INVENTOR
Harry W. Owens
BY Morrison, Kennedy
& Campbell ATTORNEYS

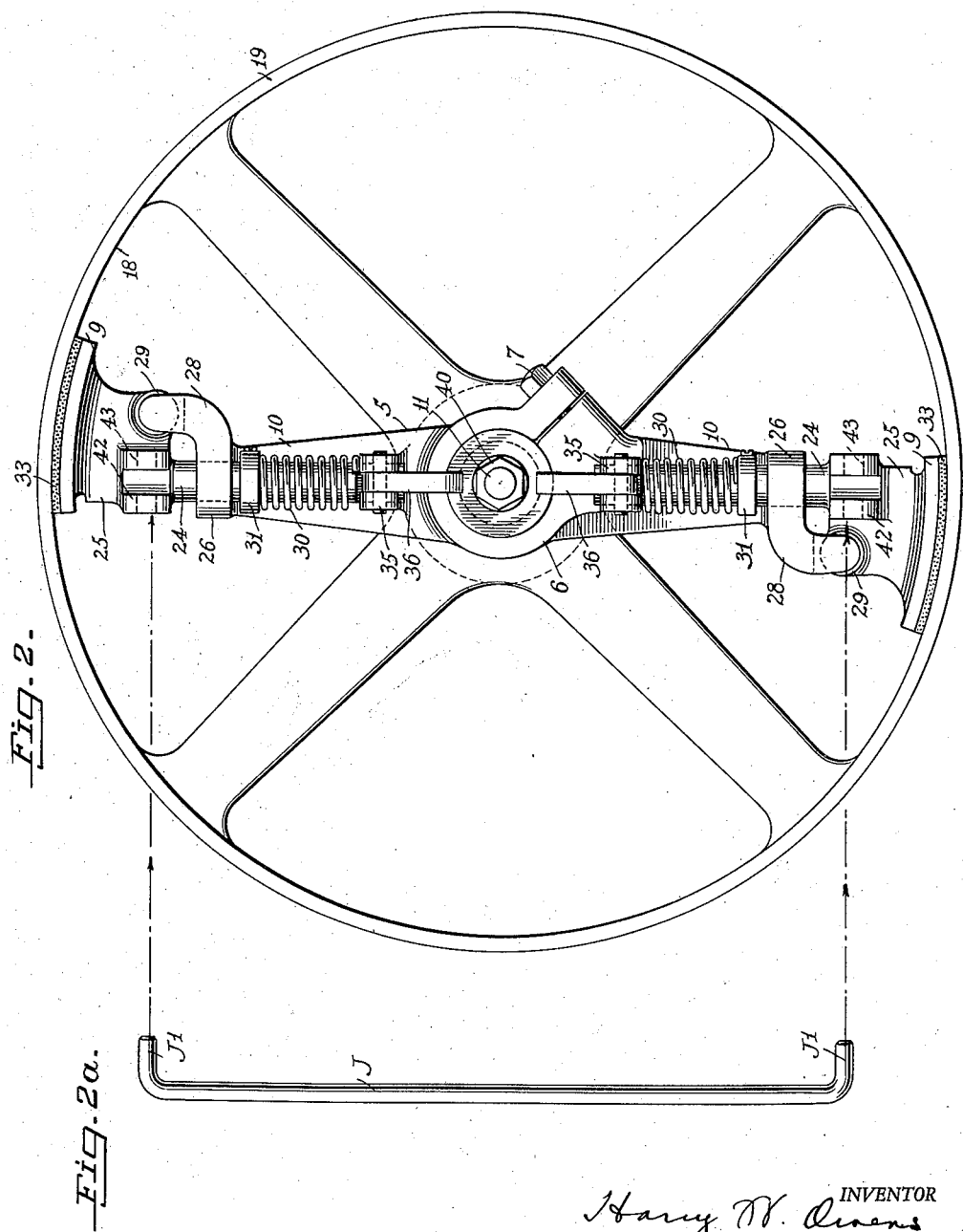

Patented Oct. 2, 1951

2,569,573

UNITED STATES PATENT OFFICE 2,569,573

SPRING ENGAGED CLUTCH FOR TYPOGRAPHICAL MACHINES

Harry W. Owens, San Francisco, Calif., assignor to Mergenthaler Linotype Company, a corporation of New York Application March 5, 1948, Serial No. 13,233

1 Claim. (Cl. 192—96)

This invention relates to typographical machines of the general organization represented in U. S. Letters Patent No. 436,532, to O. Mergenthaler, wherein circulating matrices are released from a magazine in the order in which their characters are to appear in print and then composed in line; the composed line transferred to the face of a slotted mold; the mold filled with molten metal to form a bar or slug against the matrices which produce the type characters thereon; and the matrices thereafter returned through distributing mechanism to the magazine from which they started.

More particularly, the invention relates to the driving mechanism for these machines and contemplates certain improvements in the automatic clutch through which the main cam shaft is given one complete rotation during each machine cycle of operation.

Ordinarily, the automatic clutch includes a pair of diametrically opposed shoes arranged to frictionally engage the inner surface of a rim or flange formed on a constantly driven wheel or pulley rotatably mounted on the drive shaft. The two clutch shoes are provided with integral radially disposed guide bars and are connected through the medium of a toggle device to a suitable fixture on the free end of a horizontal slide rod mounted in and protruding from the contiguous end of the drive shaft. A strong compression spring on the slide rod acts normally to straighten out the toggle and, through the latter, force both shoes simultaneously into engagement with the rim of the pulley, the shoes being faced, as usual, with a fibrous or other suitable material to make frictional contact with the inner surface of the rim. The disengagement of the clutch shoes at the end of each machine cycle is effected automatically by the operation of a so-called "clutch lever," which is adapted to move the slide rod endwise to partially collapse the toggle against the tension of the compression spring and thereby disengage the clutch shoes from the pulley rim.

With the foregoing arrangement (which has been in use on all commercial machines for many years), the slightest difference in thickness of the facing materials on the two clutch shoes, due to wear or other causes, results in a slippage of the clutch and necessitates its removal from the machine for the required repairs. Furthermore, the operation of the toggle to engage and disengage the clutch shoes requires an endwise movement of a half inch or more of the slide rod to which the toggle links are attached and, consequently, the movement of the shoes into and out of contact with the rim of the driving pulley is relatively slow and often causes chattering of the parts, with many evil results including failure to impart a complete rotation to the main cam shaft at the end of each machine cycle.

The present invention overcomes the above and other well-known difficulties which characterize the conventional clutch, by providing the two clutch shoes with separate springs which actuate them independently in effecting their engagement with the rim of the driving pulley and which thus maintain the required power of the clutch irrespective of any excessive wear to which their frictional facings may happen to be subjected. This is accomplished with the minimum alteration in the conventional clutch as will be clear from the detailed description to follow.

Referring to the drawings:

Fig. 1 is a vertical section, partly in elevation and partly broken away, showing the shoes of the clutch in frictional engagement with the rim of the driving pulley;

Fig. 2 is an end elevation of the parts shown in Fig. 1 but showing the driving pulley in a different angular position in relation to the clutch; and Fig. 2ª is an elevation of the auxiliary rod for holding the shoes of the clutch in their disengaged position to facilitate the application or removal of the supporting member of the clutch to or from the drive shaft.

As best shown in Fig. 1 the clutch mechanism includes, generally, a supporting member 5 having a split hub portion 6 secured by a clamping bolt 7 to one end of a horizontal drive shaft 8 journalled in the machine frame; a pair of diametrically opposed shoes 9 carried by radial arms 10 projecting outwardly from the hub portion of the supporting member 5; and a clutch control rod 11 arranged coaxially in the shaft 8 and mounted therein for a limited endwise movement in opposite directions. At one end, the rod 11 projects through and beyond a bearing plug 12 screwed into the contiguous end of the drive shaft 8, and the latter (as shown in Fig. 1) is drilled longitudinally to receive and support the other end of the rod. The endwise movement of the rod 11 is controlled by the operation of a forked lever 13 through the medium of a sleeve 14 slidably mounted on the shaft 8 and which is formed with an annular flange 15 disposed in engaging relation to the free end of said lever. A screw pin 16, threaded into the flange 15 and extending inwardly through a short longitudinal slot 17 in the drive shaft, is employed to establish an operative connection between the sleeve 14 and the control rod 11 and at the same time lock both of theses parts against rotary movement in relation to said shaft.

The clutch shoes 9 are capable of radial movement into and out of frictional engagement with the inner finished surface 18 on the rim of a driving pulley 19, the latter being rotatably mounted on the drive shaft 8 and arranged adjacent the clutch supporting member 5. A second pulley 20, keyed or otherwise secured to the hub 21 of the pulley 19 and driven constantly from a motor not shown, is adapted through the driving pulley 19 and the clutch shoes 9 to rotate the drive shaft 8 and the main cam shaft (not shown) during each machine cycle of operation. An oil bushing 22 (Fig. 1), driven into the hub portion of the driving pulley 19, provides for the necessary lubrication of the parts; and a flange 23 of another bushing, driven into the contiguous bearing 8$^a$ for the drive shaft 8, locates the pulley assembly with reference to said bearing in the proper longitudinal position on the shaft.

In order that the shoes 9 may be properly guided in their radial movements, they are formed with cylindrical bars 24 extending inwardly from web portions 25 of the shoes through spaced-apart bearings 26 and 27 projecting laterally from the arms 10 of the clutch supporting member 5. Twisting of the guide bars 24 in their respective bearings and the consequent angular displacement of the clutch shoes in relation to the rim of the driving pulley 19, is avoided (see Figs. 1 and 2) by offset extensions 28 of the outer bearings 26, which latter are bifurcated so as to engage finished surfaces 29 formed on the opposite side faces of the reinforcing webs 25.

As thus far described, the parts, their construction, and mode of operation are or may be the same as those shown and described in the U. S. Letters Patent to J. R. Rogers, No. 661,386, and constitute no part of the present invention, the latter being directed mainly to the means employed for effecting the engagement and disengagement of the clutch shoes with and from the rim of the driving pulley 19.

Unlike the prior construction, the clutch shoes 9 are provided with separate compression springs 30 disposed between the fixed inner bearings 27 for the guide bars 24 and collars 31 secured by set screws 32 to said bars and spaced slightly inward from the outer bearings 26. As thus arranged, the springs 30 are capable of acting independently to move the clutch shoes 9 outwardly into engagement with the rim of the driving pulley 19 and thereby insure substantially equal friction on both shoes at all times irrespective of any difference in thickness that may exist between the facing material 33 of one shoe and that of the other.

The disengagement of the clutch takes place in opposition to the springs 30 and, as best shown in Fig. 1, is effected by the operation of a pair of small elbow levers 34 identical in form and pivotally mounted respectively between ears 35 projecting from the inner bearings 27 for the guide bars 24. The elbow levers 34 are each formed with two arms 36 and 37 and are controlled by a nut 38, which latter is adjustably mounted on the protruding end portion of the control rod 11 and is provided at one end with an integral annular flange 39 for bearing contact with the arms 36 of said levers. A lock nut 40, also mounted on the rod 11 and engaging the opposite end of the nut 38, retains the latter in its different adjusted positions. The other arms 37 of the levers 34 (Fig. 1) engage within transverse recesses 41 formed transversely in the guide bars 24 and disposed within the boundaries of the inner bearings 27.

When in operation, the parts occupy the full line position shown in Fig. 1, the clutch shoes 9 at such times being held frictionally engaged with the inner finished surface 18 on the rim of the driving pulley 19 under the independent tension of the separate springs 30, and the control rod 11 together with the sleeve 14 being held in a neutral position by the springs through the medium of the elbow levers 34 which press inwardly on the nut flange 39. However, when the parts are disengaged at the end of a machine cycle, the clutch control lever 13 is actuated so as to push the sleeve 14 and rod 11 endwise in opposition to the two springs 30, from the position shown by the full lines in Fig. 1 to that indicated by the dotted lines. By this operation, the flange 39 of the nut 38 is caused to rock the elbow levers 34 about their pivotal axes and, through the engagement of their shorter arms 37 with the inner walls of the recesses 41 in the guide bars 24, effect the disengagement of the clutch shoes from the driving pulley 19 and thereby stop the operation of the machine.

In providing for the use of separate springs to effect the engagement of the clutch shoes 9, and the introduction of the small elbow levers 34 which leave them free to act independently, it has been possible to so design the parts that the distance the control rod 11 and sleeve 14 have to move has been reduced to a minimum (e. g. from three-quarters of an inch, as ordinarily required, to three-sixteenths of an inch). Consequently, the engagement and disengagement of the shoes 9 is practically instantaneous thus eliminating any chattering of the parts or any slippage of the clutch shoes in relation to the driving pulley 19.

It is further proposed, according to the present invention, to facilitate the removal and application of the clutch assembly from and to the drive shaft 8 whenever the occasion should arise. To this end, the shoes 9 are formed with lugs 42 projecting laterally from the web portions 25 thereof, and there is provided, as an auxiliary element, a straight metal locking rod J (Fig. 2$^a$) of a predetermined length and having bent-over end portions J$^1$ adapted to fit into apertures 43 in said lugs. By inserting the end portions of the rod J into the apertures 43, the clutch shoes will be held, against the influence of the springs 30, in a position to clear the inner face 18 of the driving pulley 19, the arms 36 of the levers 34 breaking their connection with the flange 39 of the nut 38 automatically or without special attention. After thus applying the locking rod J and loosening the clamping bolt 7, the supporting member 5 for the whole clutch assembly may be slid forwardly from the drive shaft 8. In this connection, it may be mentioned that the diameter of the flange 39 of the nut 38 is slightly less than the bore in the hub 6 of the clutch supporting member 5 and will therefore permit its removal from the shaft 8 without disturbing the horizontal control rod 11 and the parts connected thereto.

Having thus described my invention, what I claim is:

In a typographical machine, the combination of a hollow drive shaft, a constantly driven pulley loosely mounted on the shaft and having a rim with an internal clutch face, a supporting member fixed to the drive shaft and having a pair of radial arms extending outwardly therefrom toward the pulley rim, a pair of radially disposed guide rods slidably mounted in inner and outer bearings projecting laterally from the radial arms, clutch shoes attached to the outer ends of said guide rods for cooperation with the internal clutch face of the pulley rim, a compression spring surrounding each guide rod and pressing at its inner end against the inner bearing therefor, a collar fixed to each guide rod against which the compression spring presses at its outer end, said collar being arranged in spaced relation to the outer bearing for the rod, a pair of diametrically opposed elbow levers intermediately pivoted to ears formed on the inner bearings for the guide rods, said levers presenting horizontal arms connected to the guide rods and vertical arms extending inward into the region of the hollow drive shaft, a control rod mounted for endwise movement in the hollow drive shaft and having an end portion protruding therefrom, a collar fixed to the protruding end of the control rod and arranged with its outer face in contact with the vertical arms of the elbow levers, and actuating means connected to the control rod at its opposite end, said actuating means when operated in one direction acting to disengage the clutch shoes from the pulley rim against the tension of the compression springs and when operated in the opposite direction permitting the springs to exercise themselves in effecting the engagement of the clutch shoes with the pulley rim.

HARRY W. OWENS.

REFERENCES CITED

The following references are of record in the file of this patent:

UNITED STATES PATENTS

| Number | Name | Date |
|---|---|---|
| 93,798 | Bigelow | Aug. 17, 1869 |
| 297,489 | Bell et al. | Apr. 22, 1884 |
| 513,148 | Salomon | Jan. 23, 1894 |
| 674,164 | Hecker | May 14, 1901 |
| 1,440,575 | Anderson | Jan. 2, 1923 |
| 1,544,377 | Dalton | June 30, 1925 |
| 2,083,906 | Grimm | June 15, 1937 |
| 2,387,418 | Sundt | Oct. 23, 1945 |

FOREIGN PATENTS

| Number | Country | Date |
|---|---|---|
| 2,645 | Great Britain | Feb. 9, 1905 |